Jan. 19, 1965 R. L. VAN HUIS ETAL 3,166,048
TROUGH WATERER
Filed Dec. 18, 1961

INVENTORS
ROBERT L. VAN HUIS
JEROME M. ESSINK
BY
Price & Heneveld
ATTORNEYS

३,166,048
TROUGH WATERER
Robert L. Van Huis, Zeeland, and Jerome M. Essink, Holland, Mich., assignors to Automatic Poultry Feeder Company, Zeeland, Mich., a corporation of Michigan
Filed Dec. 18, 1961, Ser. No. 160,200
3 Claims. (Cl. 119—78)

This invention relates to waterers for poultry and the like. More particularly, this invention relates to an improved trough waterer including structure associated with its float valve for enabling the trough to be easily cleaned.

Trough waterers presently in existence usually include some sort of float valve in combination with a water inlet for assuring that water is constantly supplied to the trough and kept at an even level. Thus, as the animals drink the water from the trough, the float valve is lowered, thereby opening the source of water to refill the trough to a predetermined level controlled by the float. However, these structures presently in existence exhibit inherent disadvantages. Unless some sort of protection is afforded the valve structure, debris and droppings soon clog and impair its operation. If a protective covering is provided, but is not easily removable, the trough section adjacent the valve structure cannot be properly maintained and cleaned.

Therefore, it is an object of this invention to provide an improved trough waterer which supplies the needed protection for such a float structure.

Another object of this invention is the provision of such a trough waterer which includes a housing in association with the water source and the float valve means, the housing being readily removable.

Another object of this invention is the provision of such a housing which includes means associated therewith for raising of the float valve to cut off the water source when the housing is removed.

A still further object of this invention is the provision of such a trough waterer which enables one to remove and hold the housing, float valve and water source in one hand while cleaning that section of the water trough, the entire structure being easily replaceable after such cleaning.

A still further object of this invention is the provision of such structure which is simple, yet easily operable and low in cost.

These and other objects of this invention will become obvious to those skilled in the relevant art upon reading the following specification in conjunction with the accompanying drawings, wherein.

Briefly, this invention relates to an improved trough waterer, including a trough and a housing covering an end of the trough. A water source associated with a float valve is secured to the housing, the float valve being positioned within the housing. Means is associated with the housing for raising the float valve and cutting off the water source. The housing is detachably secured to the end of the trough whereby the housing, the water source and the float valve may be removed from the trough for cleaning thereof.

Figure 1:
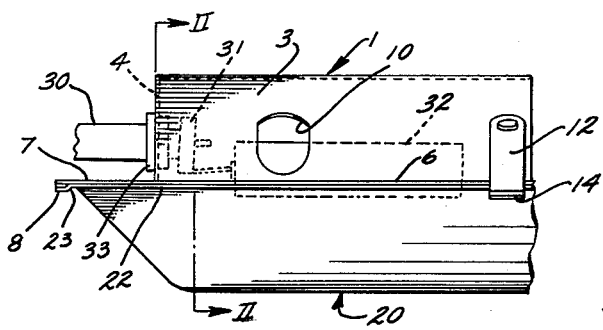
FIG. 1 is a side view of an end of a watering trough including the housing with its associated structure which comprises this invention.
Figure 2:
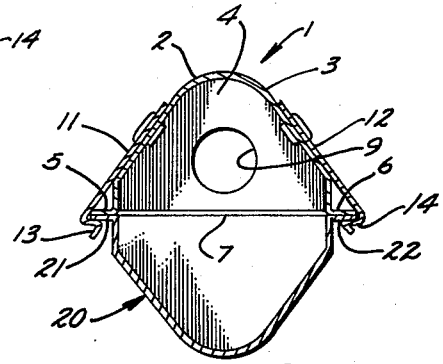
FIG. 2 is a cross-sectional view taken along the plane II—II of FIG. 1, the view being somewhat enlarged and certain parts thereof being omitted to better show the invention.

Referring more specifically to the drawing, the reference numeral 1 designates a housing detachably secured to a trough 20 (FIGS. 1 and 2). The housing 1 is especially well adapted to be formed from steel and includes side walls 2 and 3 and an end wall 4. Horizontal flanges 5 and 6 extend from the edges of side walls 2 and 3 respectively. A horizontal flange 7 extends from the bottom edge of end wall 4, the flange 7 including a hook 8 at the end thereof. An opening 9 is provided generally in the center of end wall 4, the purpose of which will be explained hereinafter. Further, a second opening 10 is formed in side wall 3, spaced from the end wall 4, the purpose of which will also be explained hereinafter.

A water source 30 comprising a flexible hose is connected to a valve means 31 which includes a float 32. The valve 31 is secured within the opening 9 in end wall 4 (FIG. 1) by suitable means, such as a lock nut 33, the float 32, as well as the valve 31 and the inlet of hose 30, thus lying under the housing 1. Thus assembled, the housing 1 is detachably secured to an end of the trough 20.

Trough 20 includes a pair of flanges 21 and 22 along its upper side edges, together with a hook receiving means 23 at its end. A pair of straps 11 and 12 are secured to the sides 2 and 3 of the housing 1. The straps 11 and 12 include hook portions 13 and 14 at their respective ends. Thus, it will be seen that the hook 8 at the end of the flange 7 of the housing 1 may be inserted into the hook receiving means 23 at the end of the trough 20, the housing then lowered such that the flanges 5 and 6 of the housing 1 rest against the flanges 21 and 22 of the trough 20. The straps 11 and 12 are resilient and may be biased outwardly such that the hooks 13 and 14 may be positioned under the flanges 21 and 22 as shown in FIG. 2, thus holding the housing in position.

It will now be seen that the entire end of the trough 20 is covered, as well as the valve 31 and the float 32. Thus, as water is removed from the trough, lowering of the float 32 opens the valve 31 to admit water to the trough—raising of the float 32 cutting off the water source. This operation is not hampered by waste and litter being deposited or coming in contact with the structure shown. However, if one desires to clean the end of the trough, he merely inserts his finger through the opening 10 in side wall 3 and manually raises the float 32, thereby cutting off the water supply from the hose 30. Next, by merely biasing the straps 11 and 12 outwardly, the entire housing 1, the water source and the valve may be removed from the trough 20, allowing quick and simple cleaning of the trough. This is accomplished without the necessity for shutting off the water source at another point or manipulating of the valve and its associated structure.

Figure 3:
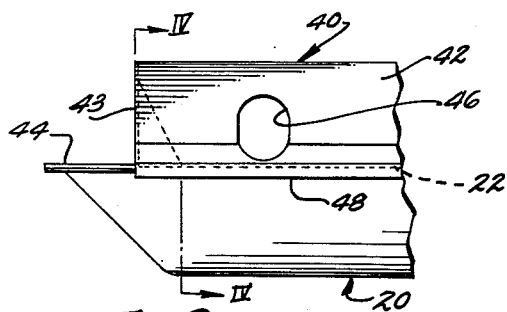
FIG. 3 is a view similar to FIG. 1, an alternative embodiment of the housing being shown, certain parts thereof being omitted to more clearly show the invention.
Figure 4:
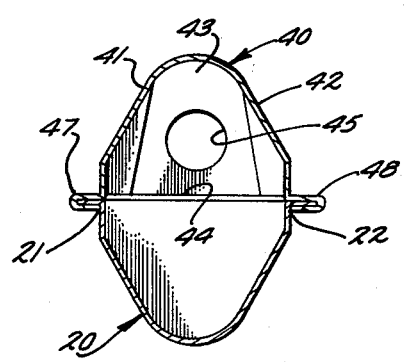
FIG. 4 is a cross-sectional view taken along the plane IV—IV of FIG. 3, the view being slightly enlarged.

FIGS. 3 and 4 show an alternative embodiment of the housing 1, designated by the reference numeral 40. The housing 40 includes a pair of side walls 41 and 42, together with an end wall 43. A horizontal flange 44 extends from the bottom edge of the end wall 43. An opening 45 is formed in end wall 43 and an opening 46 is formed in the side wall 42, the purposes of the openings 45 and 46 being the same as that of openings 9 and 10 respectively in housing 1 described hereinbefore. The housing 40 is fabricated from a suitable plastic having a degree of flexibility. Inwardly facing grooves 47 and 48 are formed along the bottom edges of side walls 41 and 42 respectively. These grooves are formed to mate with the flanges 21 and 22 at the side edges of the trough 20. Thus, it will be seen that the housing 40 may be positioned on the end of the trough 20, the side walls 41 and 42 of the housing 40 flexed outwardly so that the grooves 47 and 48 receive the flanges 21 and 22 of the trough 20. Again, it will be noted that the housing 40 may be quickly and simply detached from the end of the trough 20. The entire end of the trough 20 is covered and as described before, the water source, the valve, the float and the housing may be quickly and simply removed for cleaning of the trough.

Figure 5:
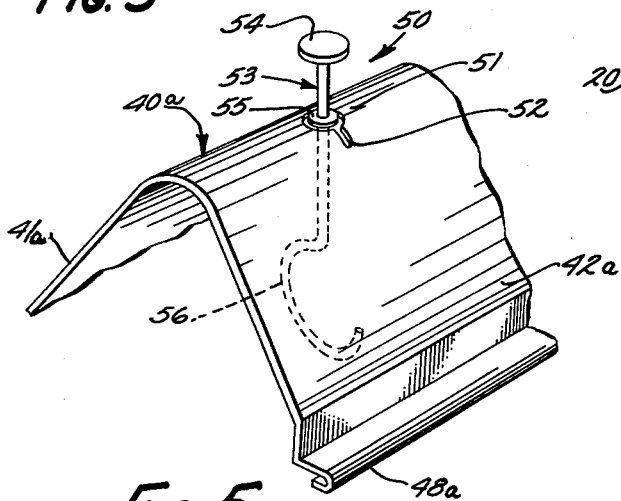
FIG. 5 is a perspective view of a portion of a housing similar to the housing shown in FIG. 3, drawn to an enlarged scale an alternative float raising means being shown.

In FIG. 5, a means 50 is shown in combination with the housing 40a for lifting and holding the float. In this modified structure, a key-shaped slot 51 having a tail portion 52 is formed in the top of the housing 40a, similar to the housing 40 already described, the housing 40a including side walls 41a and 42a, together with grooves along the edges of the side walls, one of which is designated by the reference numeral 48a. A hook member 53, including an enlarged head 54, a stop means 55 and a hook portion 56 is movable within the slot 51. The stop means 55 is movable through the enlarged portion of the slot 51, but is not movable with respect to the tail portion 52 of the slot. The enlarged head 54 prevents the hook member 53 from dropping through the top of the housing 40a. The hook portion 56 is adapted to encircle the float and lie therebelow. Upon raising the hook member 53, the hook portion 56 engages the float and raises it, and holds it in raised position upon positioning the stop means 55 above the tail 52 of the slot 51. With this structure, an opening in the side of the housing is unnecessary and the water supply remains cut off even if the person cleaning the trough lays the structure on the ground and removes his hand from it. It should be understood from the description provided herein that the means 50 may also be utilized with the housing 1 described hereinbefore, the opening 10 then being unnecessary.

It will now be noted that this invention has provided an improved watering trough which provides for the covering of the water inlet, the valve and its associated structure. However, the covering and the mentioned structure may be quickly and simply removed for cleaning, without the necessity of shutting the water off at its source. This is accomplished by structure exhibiting simplicity of design, allowing ease of operation and fabrication.

While only certain embodiments of this invention have been shown and described, it may be possible to practice the invention through the utilization of certain other embodiments without departing from the spirit and scope thereof. Such other embodiments are to be included as part of this invention unless the following claims specifically state otherwise.

We claim:

1. An improved trough waterer, including: a trough; an upstanding canopy housing rising over and covering an end of said trough; a source of pressurized water; a valve having a float associated with said water source, said valve being secured to said housing, said float valve positioned within said housing substantially above the confines of said trough; means associated with said housing whereby said float may be raised and thereby shutting off said valve; and said housing detachably secured to said end of said trough whereby said housing, said water source and said float valve may be slidably removed from said trough for cleaning of said trough so that there is no alteration or diminution of the water pressure at the said source.

2. An improved trough waterer as defined in claim 1, said means associated with said housing whereby said float may be raised and thereby shutting off said valve comprising an opening formed in said housing giving finger access thereinto.

3. An improved trough waterer as defined in claim 1, said means associated with said housing whereby said float may be raised and thereby shutting off said valve comprising a key-shaped slot in the top of said housing, a hook having a head larger than said slot and a stop means spaced from said head for cooperation with the tail of said key-shaped slot.

References Cited in the file of this patent

UNITED STATES PATENTS

| | | |
|---|---|---|
| 846,424 | Pelmulder | Mar. 5, 1907 |
| 1,843,296 | Olson | Feb. 2, 1932 |
| 2,142,556 | Carr | Jan. 3, 1939 |

FOREIGN PATENTS

| | | |
|---|---|---|
| 730,900 | Great Britain | June 1, 1955 |